United States Patent
Kim et al.

(10) Patent No.: US 9,809,089 B2
(45) Date of Patent: Nov. 7, 2017

(54) AROMA-DIFFUSING CARTRIDGE FOR VEHICLE

(71) Applicant: HANON SYSTEMS, Daedeok-gu, Daejeon (KR)

(72) Inventors: Jaeho Kim, Daejeon (KR); Kihong Kim, Daejeon (KR); Yongjun Jee, Daejeon (KR); Junseong Ahn, Daejeon (KR); Giwoo Ro, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 101 days.

(21) Appl. No.: 14/652,392

(22) PCT Filed: Dec. 27, 2013

(86) PCT No.: PCT/KR2013/012273
§ 371 (c)(1),
(2) Date: Jun. 15, 2015

(87) PCT Pub. No.: WO2014/104793
PCT Pub. Date: Jul. 3, 2014

(65) Prior Publication Data
US 2016/0193900 A1    Jul. 7, 2016

(30) Foreign Application Priority Data

Dec. 28, 2012  (KR) .................. 10-2012-0155731
Dec. 27, 2013  (KR) .................. 10-2013-0164725

(51) Int. Cl.
*B60H 3/00*    (2006.01)
(52) U.S. Cl.
CPC ... *B60H 3/0007* (2013.01); *B60H 2003/0064* (2013.01)

(58) Field of Classification Search
CPC .................. B60H 3/0007; B60H 2003/0064
(Continued)

(56) References Cited

U.S. PATENT DOCUMENTS 6,834,847 B2 * 12/2004 Bartsch ............... A01M 1/2033
                                                      261/26
7,528,102 B2 *  5/2009 Barthel ............... A47L 15/4445
                                                      422/5

(Continued)

FOREIGN PATENT DOCUMENTS

JP    2003237364 A    8/2003
JP    2003276429 A    9/2003
(Continued)

OTHER PUBLICATIONS

International Search Report dated Mar. 24, 2014.

*Primary Examiner* — Charles Bushey
(74) *Attorney, Agent, or Firm* — Dickinson Wright PLLC (57) ABSTRACT

Disclosed is an aroma-diffusing cartridge for a vehicle wherein the structures of the cartridge and a carrier of an aroma are so optimized that the capacity of the carrier for carrying the aroma may become excellent together with stable and continuous performance of diffusing the aroma. An aroma-diffusing cartridge for a vehicle includes: a cartridge body having one side formed with a pair of air holes for receiving and discharging air, and an internal space for circulating the received air; and at least two carriers put in the cartridge body with different duration of keeping an aroma. Thus, the capacity of the carriers for carrying an aroma is excellent together with stable and continuous performance of diffusing the aroma in a limited space, so that the air in the vehicle may be kept agreeable for a long time.

11 Claims, 5 Drawing Sheets

(58) Field of Classification Search
USPC .............................. 261/30, DIG. 88, DIG. 89
See application file for complete search history.

(56) References Cited

U.S. PATENT DOCUMENTS

| | | | | |
|---|---|---|---|---|
| 8,119,064 B2* | 2/2012 | Woo | ..................... | A01M 1/2033 |
| | | | | 239/34 |
| 8,170,405 B2* | 5/2012 | Harris | ................. | A01M 1/2033 |
| | | | | 392/386 |
| 2006/0186219 A1* | 8/2006 | Kent | ......................... | A61L 9/12 |
| | | | | 239/60 |
| 2008/0020699 A1 | 1/2008 | Hara et al. | | |
| 2008/0219897 A1* | 9/2008 | Macor | ....................... | A61L 9/04 |
| | | | | 422/123 |
| 2010/0187327 A1* | 7/2010 | Irvin | ........................ | A61L 9/125 |
| | | | | 239/47 |
| 2011/0226866 A1* | 9/2011 | Kim | .......................... | A61L 9/12 |
| | | | | 239/34 |
| 2011/0290903 A1* | 12/2011 | Nagano | ..................... | A61L 9/12 |
| | | | | 239/34 |

FOREIGN PATENT DOCUMENTS

| | | |
|---|---|---|
| JP | 2006081618 A | 3/2006 |
| JP | 2010179786 A | 8/2010 |
| KR | 10-2010-0093724 A | 8/2010 |

\* cited by examiner

FIG. 1

PRIOR ART

AROMA-DIFFUSING CARTRIDGE FOR VEHICLE

BACKGROUND OF THE INVENTION

Field of the Invention

The present invention relates to an aroma-diffusing cartridge for a vehicle, and more particularly, to an aroma-diffusing cartridge for a vehicle which is disposed on an air conditioning apparatus for the vehicle to mix diffused aroma components with air-conditioning air and to discharge the mixture to the inside of the vehicle.

Background Art

An air conditioning apparatus for a vehicle is a device to cool or heat the inside of the vehicle by cooling or heating air while introducing outside air of the vehicle into the inside of the vehicle or circulating inside air of the vehicle. The air conditioning apparatus includes: an evaporator which blows air into an air-conditioning case by a blower unit and serves to cool the inside of the air-conditioning case; and a heater core serving a heating action, and selectively blows the air cooled by the evaporator or heated by the heater core to each part of the inside of the vehicle using a mode-switching door.

Recently, when the air conditioning apparatus is operated while a vehicle is running, various harmful substances, such as dust or smoke gas, are introduced into the inside of the vehicle. Moreover, when the air conditioning apparatus is operated in the humid weather, bacterial foreign substances such as molds living on an air-conditioning duct are introduced into the inside of the vehicle as they are. Accordingly, an aroma generator for purifying air inside the vehicle has been used.

Figure 1:
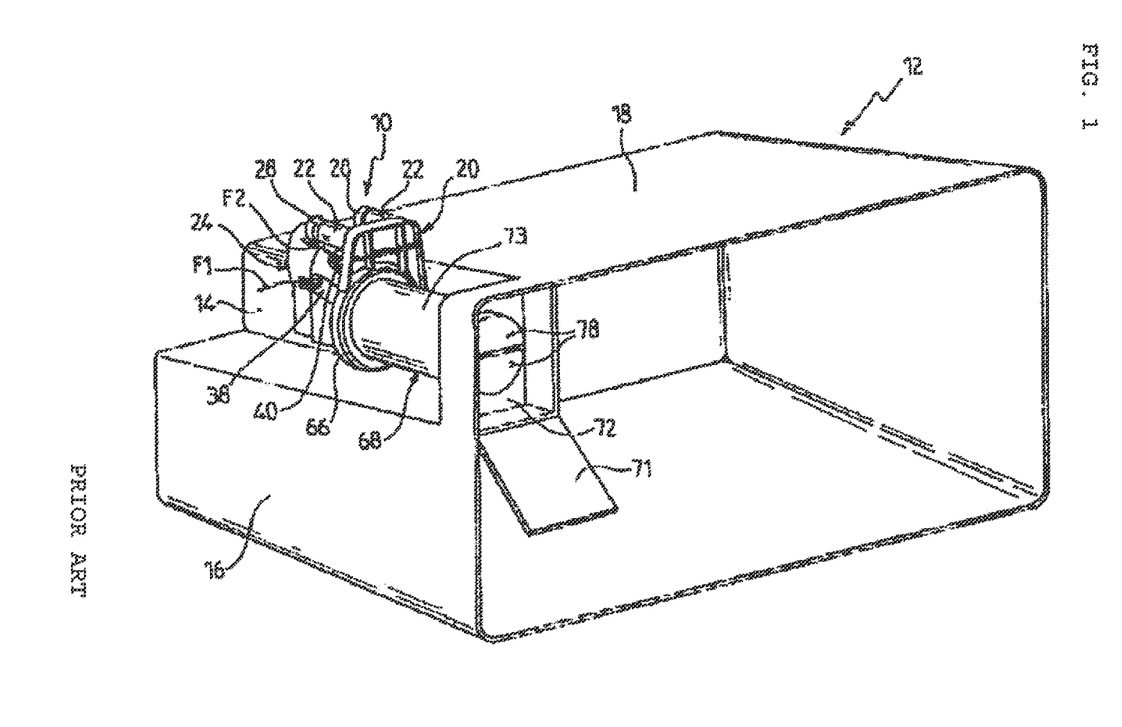
FIG. 1 is a perspective view of an aroma-diffusing device for a vehicle according to a prior art.

Japanese patent Laid open publication No. 2003-237364 discloses an aroma-diffusing device mounted on an air conditioning apparatus for a vehicle as a prior art. As shown in FIG. 1, the aroma-diffusing device 10 according to the prior art is attached to a corner 14 of a glove box 12 by a support plate 20. The aroma-diffusing device 10 includes a main body 68, a cartridge 78, a support plate 20, an actuator 24, and so on.

The support plate 20 has a round sheet which is embedded therein and has an opening part through which air flows in and out, and includes an inflow pipe 38 and an outflow pipe 40 which are communicated with the opening part. Moreover, the aroma-diffusing device further includes a connection pipe which is elongated between the inflow pipe 38 and the air conditioning apparatus to receive air from the air conditioning apparatus.

However, the aroma-diffusing device according to the prior art has several disadvantages. In that it is decreased in aromatic intensity and cannot maintain continuous and stable aroma diffusion performance as time goes by because the aroma-diffusing device is continuously exposed to the air flowing path inside the air conditioning apparatus. Therefore, it requires frequent replacement because the lifespan of the cartridge is short.

SUMMARY OF THE INVENTION

Accordingly, the present invention has been made to solve the above-mentioned problems occurring in the prior arts, and it is an object of the present invention to provide an aroma-diffusing cartridge for a vehicle, which optimizes a structure of a cartridge and a configuration of the carrier, thereby providing excellent aroma containing amount of a carrier and stable and continuous aroma-diffusing performance.

To accomplish the above object, according to the present invention, there is provided an aroma-diffusing cartridge for a vehicle including: a cartridge body which has a pair of vent holes at one side to make air flow in and out and a space part which is a passage formed therein to allow the inflow air to flow; and at least two carriers which are disposed inside the cartridge body and have different aroma maintaining terms from each other.

In the present invention, the carriers include: first carriers having a honeycomb structure of a gel type; a second carrier made of porous resin which contains liquid aroma; and third carriers having a hollow form which contains gel.

Moreover, the second carrier contains aroma for a relatively short term, the first carriers contain aroma for a relatively long term, and the third carriers contain aroma for a relatively medium term.

In the above, the first carriers are disposed inside the cartridge body, the second carrier is put on the upper portion of the first carriers, and the third carriers are smaller than the first carriers and charge an upper space of the second carrier.

In the above, a pair of vent holes are arranged at the upper portion of the cartridge body side by side, and the passage formed by the inner space of the cartridge body has at least one bent section formed till the inflow air is discharged out.

In the above, the first carriers are in a pair and are spaced apart from each other at the lower portion of the vent holes, and a space formed between the first carriers is charged with the third carriers.

In the above, the second carrier is in a plate form and completely covers the upper portions of the first carriers.

In the above, the aroma-diffusing cartridge for a vehicle according to the present invention further includes diffusing bodies of a mesh structure which are formed to cover the vent holes and serve to introduce uniform diffusion of the air which flows in and out.

In the above, each of the first carriers and each of the third carriers respectively have coating layers formed on at least one side thereof.

In the above, the air introduced via one vent hole flows to the third carriers, the second carrier and the first carriers in order, and then, is discharged out through the first carriers, the second carrier and the third carriers via the other vent hole in order.

In the above, the vent holes are respectively formed on different sides of the cartridge body, and the air introduced through one vent hole flows to the third carriers, the second carrier and the first carriers in order, and then, is discharged out through the first carriers, the second carrier and the third carriers via the other vent hole in order.

The aroma-diffusing cartridge for a vehicle according to the present invention has excellent aroma containing amount of the carrier and provides stable and continuous aroma-diffusing performance within a limited space, thereby maintaining pleasant air inside the vehicle for a long time.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, referring to the attached drawings, a technical configuration of an aroma-diffusing cartridge for a vehicle according to the present invention will be described in detail as follows.

Figure 2:
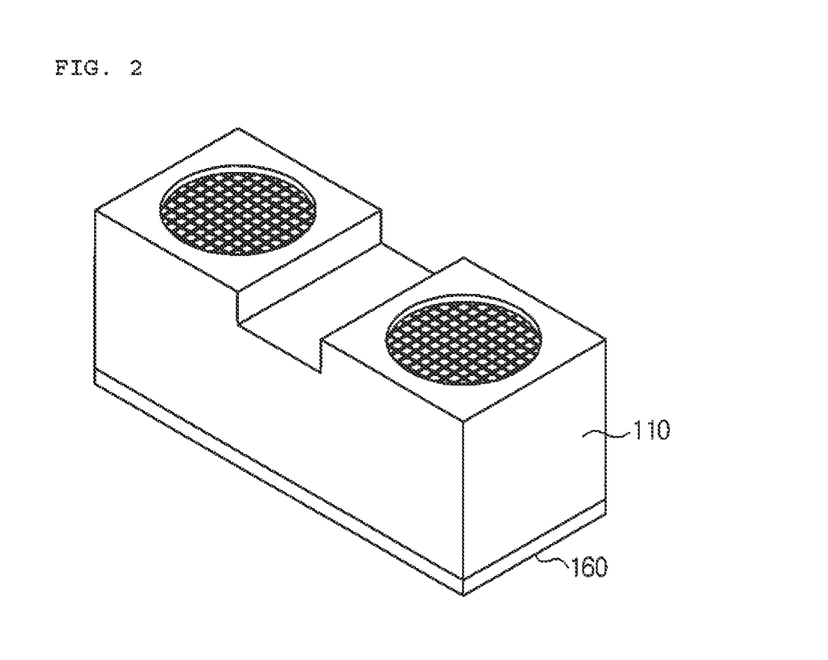
FIG. 2 is a perspective view of an aroma-diffusing cartridge for a vehicle according to a preferred embodiment of the present invention.
Figure 3:
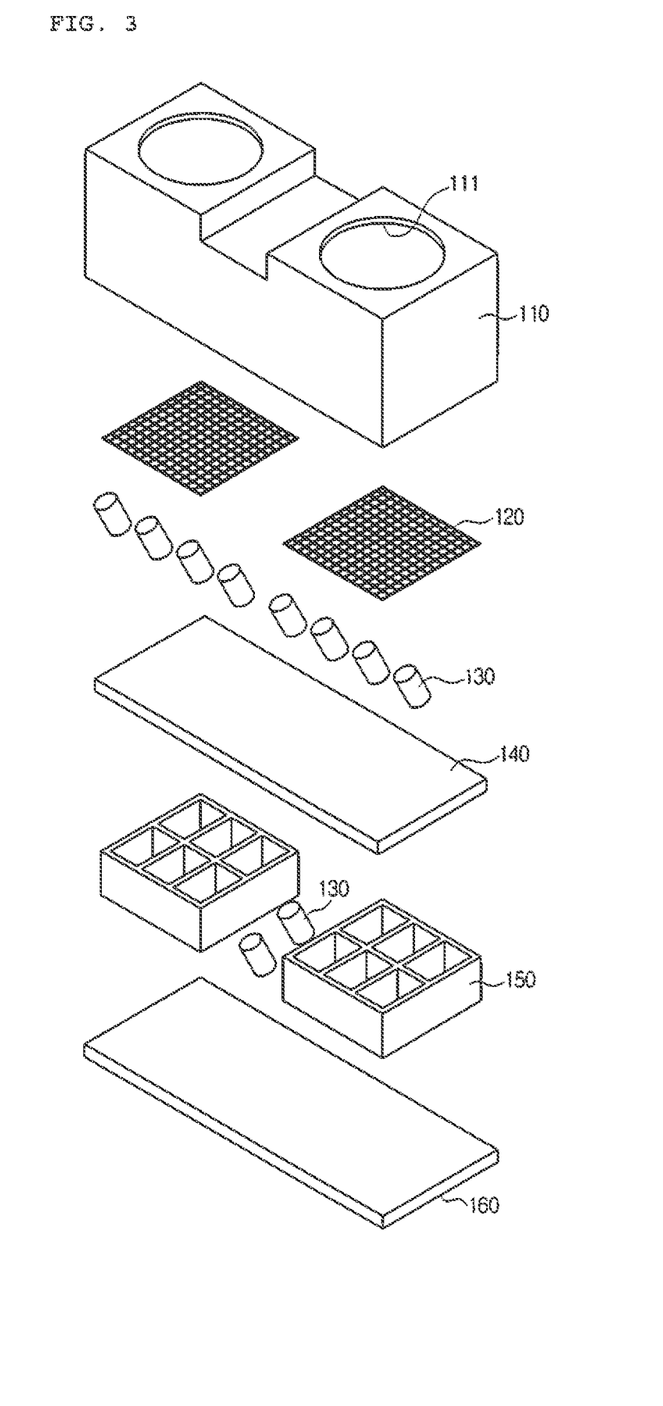
FIG. 3 is an exploded perspective view of the aroma-diffusing cartridge for a vehicle according to the preferred embodiment of the present invention.
Figure 4:
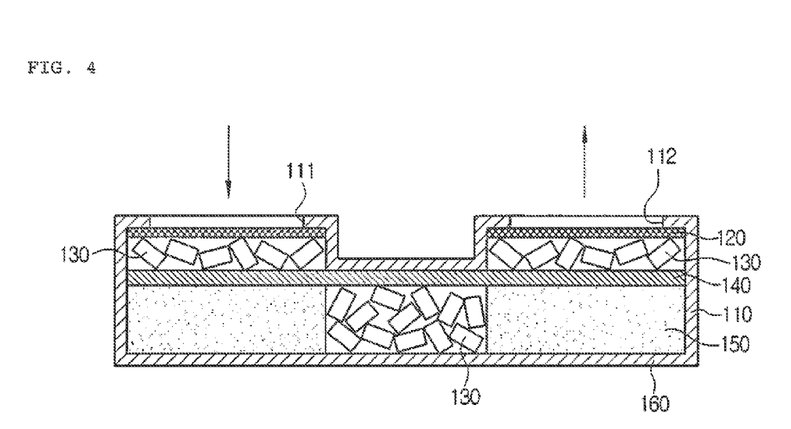
FIG. 4 is a cross sectional view showing the inside of the aroma-diffusing cartridge for a vehicle according to the preferred embodiment of the present invention.
Figure 5:
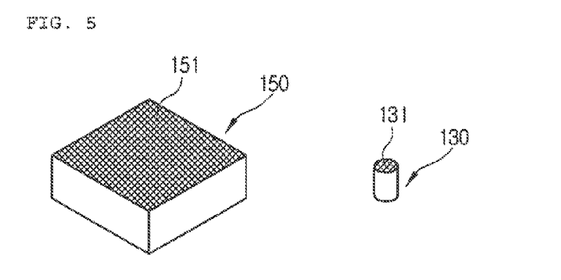
FIG. 5 is a perspective view showing a first carrier and a third carrier of the aroma-diffusing cartridge for a vehicle according to the preferred embodiment of the present invention.

FIG. 2 is a perspective view of an aroma-diffusing cartridge for a vehicle according to a preferred embodiment of the present invention, FIG. 3 is an exploded perspective view of the aroma-diffusing cartridge, FIG. 4 is a cross sectional view showing the inside of the aroma-diffusing cartridge, and FIG. 5 is a perspective view showing a first carrier and a third carrier of the aroma-diffusing cartridge.

As shown in FIGS. 2 to 5, the aroma-diffusing cartridge for a vehicle according to the preferred embodiment of the present invention includes a cartridge body 110, first carriers 150, a second carrier 140, third carriers 130 and diffusing bodies 120.

The cartridge body 110 includes a pair of vent holes 111 and 112 formed at one side to make air flow in and out and a space which is a passage formed therein to allow the inflow air to flow. In more detail, the vent holes 111 and 112 are arranged at the upper portion of the cartridge body 110 side by side, and the passage formed by the inner space of the cartridge body 110 has at least one bent section formed till the inflow air is discharged out. In this instance, the cartridge body 110 is joined with a lower body 160 to form an assembly.

The cartridge body 110 is formed in a shape of an approximately rectangular parallelepiped, and the vent holes 111 and 112 are formed side by side. A stepped portion which is a bent section is formed between the vent holes 111 and 112. That is, the vent holes 111 and 112 which respectively form an air inlet and an air outlet of the cartridge body 110 are respectively arranged at one side and the other side of the cartridge body 110. The air passage connects the vent holes 111 and 112 with each other is formed to have at least one bent section.

Therefore, the aroma-diffusing cartridge for a vehicle according to the present invention forms the structure that flowing air within a limited space stays in the cartridge body 110 as long as possible so as to increase aroma-diffusing effect. In this instance, the cartridge body 110 is not limited to the shape of the rectangular parallelepiped but may have another shape.

A plurality of carriers which contain and emit aroma according to the air flow passage are arranged and mounted inside the cartridge body 110. The carriers are formed to have different aroma containing structures so that they have different aroma containing and emitting terms from one another.

The first carriers 150 which are disposed inside the cartridge body 110 are formed in a shape of an approximately rectangular parallelepiped and are located at the lowest portion of the cartridge body 110. The first carrier 150 is in a honeycomb structure which contains aroma-concentrated gel. The first carrier 150 contains aroma for a relatively long term. The honeycomb structure and the aroma-concentrated gel may help the first carrier 150 hold aroma for a long term.

The first carriers 150 are in a pair and are spaced apart from each other. Finally, the first carriers 150 are respectively located at the lower portions of the vent holes 111 and 112. Therefore, the air flowing into one vent hole 111 is discharged out through the other vent hole 112 while sufficiently passing the first carriers 150. In this instance, a coating layer 151 may be formed on at least one side of the first carrier 150. The coating layer 151 makes the aromatic components contained in the first carrier 150 be maintained longer.

The second carrier 140 is put on the upper portion of the first carriers 150 and is made of porous resin, such as porous ceramics and polymer to contain aroma for a relatively short term. Through the porous structure and the structure for containing liquid aroma, the second carrier 140 can contain aroma for a short term.

Furthermore, the second carrier 140 is formed in a plate type to completely cover the upper portions of the first carriers 150. Therefore, the air introduced into one of the vent holes 111 and 112 passes the second carrier 140 without fail, and then, goes by way of the first carriers 150. As described above, because the flowing air passes all of the second carrier 140 which has the short-term aroma containing property and the first carriers 150 which have the long-term aroma containing property. The aroma-diffusing cartridge for a vehicle according to the present invention can maintain stable and continuous aroma emission complexly.

The third carriers 130 are in the form of pellets and have a hollow form which contains aroma-concentrated gel. The third carriers 130 is smaller than the first carriers 150, and charge an upper space of the second carrier 140 in the plural. The third carriers 130 contain aroma for a relatively medium term. That is, the third carriers 130 contain concentrated gel-type aroma which is maintained longer than liquid type aroma. The third carriers 130 are smaller in form and size than the first carriers 150 of a honeycomb form and have the aroma containing term shorter than the first carriers 150.

Finally, the air introduced into one of the vent holes 111 and 112 goes by way of the first carriers 150 after passing through the third carriers 130 and the second carrier 140 without fail. As described above, while the flowing air passes through all of the third carriers 130 which have the aroma containing property of the medium term, the second carrier 140 which has the aroma containing property of the short term, and the first carriers 150 which have the aroma containing property of the long term, the aroma-diffusing cartridge according to the present invention can maintain stable and continuous aroma emission complexly.

Moreover, preferably, the space formed between the first carriers 150 is charged with additional third carriers 130. Finally, the third carriers 130 closely charge the space which is not charged with the first carriers 150 and the second carrier 140 so as to emit aroma more continuously and stably. Additionally, a coating layer may be formed on at least one side of the third carriers 130. The coating layer 131 makes the aromatic components contained in the third carriers 130 last longer.

In short, the carriers include: the first carriers 150 arranged on the air passage of the cartridge body 110; the third carriers 130 arranged to be adjacent to a pair of the vent holes 111 and 112 which form the air inlet and the air outlet; and the second carrier 140 arranged between the first carriers 150 and the third carriers 130.

The first carriers 150 are longer in the aroma containing and emitting term than the second carrier 140 and the third carriers 130, and are arranged at a position which does not directly faces the vent holes 111 and 112. The second carrier 140 has an aroma containing structure that the aroma containing and emitting term is shorter than that of the first carriers 150 and the third carriers 130, and is arranged between the first carriers 150 and the third carriers 130. The third carriers 130 has an aroma containing structure that the aroma containing and emitting term is shorter than that of the first carriers 150 and longer than that of the second carrier 140, and is arranged to be adjacent to the vent holes 111 and 112.

Moreover, the first carriers 150 are arranged on the air passage of the cartridge body 110 in the plural, and the third carriers 130 are additionally arranged between the first carriers 150 arranged on the air passage. Furthermore, the first carriers 150, the second carrier 140 and the third carriers 130 are arranged in such a way that the air introduced into the cartridge body 110 through the vent hole 111 passes the first carriers 150, the second carrier 140 and the third carriers 130 in turn at least twice.

Finally, the cartridge body 110 has at least two carriers which are disposed inside the cartridge body 110 and have different aroma containing terms from each other, in order to provide stable and continuous aroma-diffusing performance within the limited space.

The diffusing bodies 120 have a mesh structure formed to cover the vent holes 111 and 112 and serve to introduce uniform diffusion of the air which flows in and out. Preferably, the diffusing body 120 is arranged above the upper portions of the third carriers 130 inside the space of the cartridge body 110.

The air introduced through one vent hole 111 flows to the third carriers 130, the second carrier 140 and the first carriers 150 in order after passing through the diffusing body 120, and then, passes through the third carriers 130 after moving in the horizontal direction. After that, the air flows through the first carriers 150, the second carrier 140 and the third carriers 130 in order, passes the diffusing body 120, and then, is discharged out via the other vent hole 112.

Figure 6:
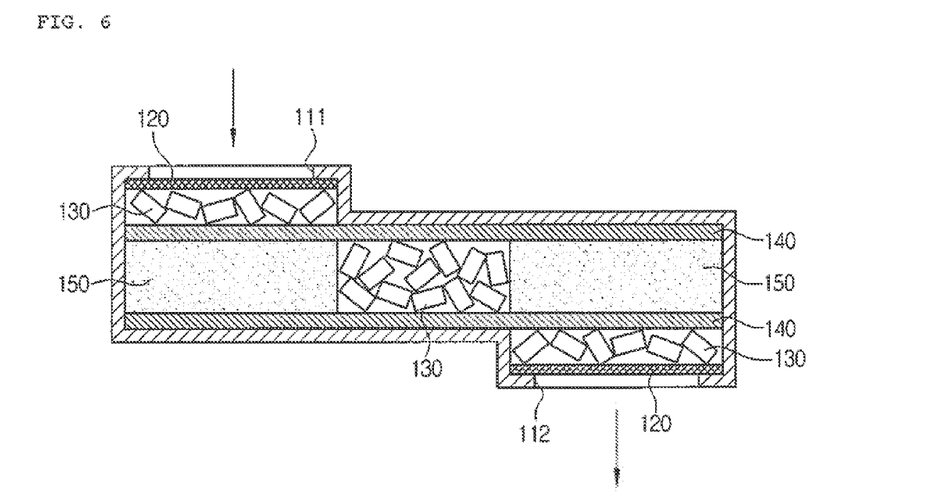
FIG. 6 is a cross sectional view showing the inside of the aroma-diffusing cartridge for a vehicle according to a modification of FIG. 4.

FIG. 6 is a cross sectional view showing the inside of the aroma-diffusing cartridge for a vehicle according to a modification of FIG. 4. Referring to FIG. 6, the vent holes 111 and 112 are formed on different sides of the cartridge body 110. That is, the vent holes 111 and 112 are respectively formed on the upper side and the lower side of the cartridge body 110 or on the upper side and the flank or on the lower side and the flank. In the variant of the present invention, the vent hole 111 for introducing the air is formed on the upper side of the cartridge body 110, and the vent hole 112 for discharging the air is formed on the lower side of the cartridge body 110.

Moreover, inside the cartridge body 110, the first carriers 150, the second carrier 140 and the third carriers 130 are stacked up at the vent hole 111, through which the air is introduced in the horizontal direction, in order, and the third carriers 130, the second carrier 140 and the first carriers 150 are stacked up at the other vent hole 112, through which the air is discharged out in the horizontal direction, in order. The diffusing body 120 is mounted at each of the vent holes 111 and 112.

Finally, the air introduced into one vent hole 111 flows to the third carriers 130, the second carrier 140 and the first carriers 150 in order after passing through the diffusing body 120, flows to the first carriers 150, the second carrier 140 and the third carriers 130 in order after passing the third carriers 130, and then, is discharged out through the other vent hole 112 after passing through the diffusing body 120.

Figure 7:
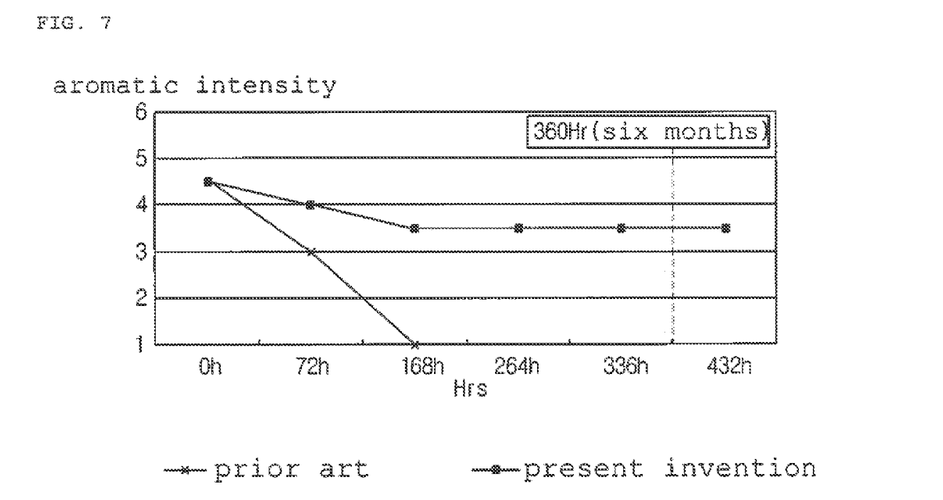
FIG. 7 is a view showing increment in aromatic intensity of the aroma-diffusing cartridge for a vehicle according to the present invention in comparison with the aroma-diffusing device according to the prior art.

FIG. 7 is a view showing increment in aromatic intensity of the aroma-diffusing cartridge for a vehicle according to the present invention in comparison with the aroma-diffusing device according to the prior art.

Referring to FIG. 7, it was revealed that the aroma-diffusing cartridge for a vehicle according to the preferred embodiment of the present invention emits aroma longer than the conventional aroma-diffusing device.

As described above, while the present invention has been shown and described with reference to the example embodiments illustrated in the drawings, it will be understood by those of ordinary skill in the art that the above embodiments of the present invention are all exemplified and various changes and equivalences may be made therein without departing from the technical idea of the present invention. Therefore, it would be understood that the technical and protective scope of the present invention shall be defined by the technical idea as defined by the following claims.

What is claimed is:

1. An aroma-diffusing cartridge for a vehicle comprising:
a cartridge body which has a pair of vent holes at one side to make air flow in and out and a space which is a passage formed therein to allow the inflow air to flow;
a plurality of carriers arranged and mounted inside the cartridge body to contain and emit aroma according to an air flow path,
wherein the carriers have different aroma containing structures that are different in aroma containing and emitting term from one another;
wherein at least one of the carriers is relatively longer or shorter in aroma containing and emitting term than the other carriers;
wherein the vent holes which respectively form an air inlet and an air outlet of the cartridge body are respectively arranged at one side and the other side of the cartridge body, and the air passage which connects the vent holes has at least one bent section;
wherein the carriers comprise first carriers arranged on the air passage of the cartridge body, third carriers arranged to be adjacent to a pair of the vent holes which respectively form an air inlet and an air outlet, and a second carrier arranged between the first carriers and the third carriers;
wherein the first carriers are longer in aroma containing and emitting term than the second carrier and the third carriers; and
wherein the first carriers which are the longest in the aroma containing and emitting term are arranged at a position which does not directly touch the vent holes.

2. An aroma-diffusing cartridge for a vehicle comprising:
a cartridge body which has a pair of vent holes at one side to make air flow in and out and a space which is a passage formed therein to allow the inflow air to flow;

a plurality of carriers arranged and mounted inside the cartridge body to contain and emit aroma according to an air flow path, wherein the carriers have different aroma containing structures that are different in aroma containing and emitting term from one another;

wherein at least one of the carriers is relatively longer or shorter in aroma containing and emitting term than the other carriers;

wherein the vent holes which respectively form an air inlet and an air outlet of the cartridge body are respectively arranged at one side and the other side of the cartridge body, and the air passage which connects the vent holes has at least one bent section;

wherein the carriers comprise first carriers arranged on the air passage of the cartridge body, third carriers arranged to be adjacent to a pair of the vent holes which respectively form an air inlet and an air outlet, and a second carrier arranged between the first carriers and the third carriers;

wherein the second carrier has an aroma containing structure that the aroma containing and emitting term is shorter than that of the first carriers and the third carriers; and wherein the second carrier which is the shortest in the aroma containing and emitting term is arranged between the first carriers and the third carriers.

3. An aroma-diffusing cartridge for a vehicle comprising:
a cartridge body which has a pair of vent holes at one side to make air flow in and out and a space which is a passage formed therein to allow the inflow air to flow;
a plurality of carriers arranged and mounted inside the cartridge body to contain and emit aroma according to an air flow path, wherein the carriers have different aroma containing structures that are different in aroma containing and emitting term from one another;

wherein at least one of the carriers is relatively longer or shorter in aroma containing and emitting term than the other carriers;

wherein the vent holes which respectively form an air inlet and an air outlet of the cartridge body are respectively arranged at one side and the other side of the cartridge body, and the air passage which connects the vent holes has at least one bent section;

wherein the carriers comprise first carriers arranged on the air passage of the cartridge body, third carriers arranged to be adjacent to a pair of the vent holes which respectively form an air inlet and an air outlet, and a second carrier arranged between the first carriers and the third carriers;

wherein the third carriers has an aroma containing structure that the aroma containing and emitting term is shorter than that of the first carriers and is longer than that of the second carrier; and wherein the third carriers which are intermediate in the aroma containing and emitting term between the first carriers and the second carrier are arranged to be adjacent to the vent holes.

4. An aroma-diffusing cartridge for a vehicle comprising:
a cartridge body which has a pair of vent holes at one side to make air flow in and out and a space which is a passage formed therein to allow the inflow air to flow;
a plurality of carriers arranged and mounted inside the cartridge body to contain and emit aroma according to an air flow path, wherein the carriers have different aroma containing structures that are different in aroma containing and emitting term from one another;

wherein at least one of the carriers is relatively longer or shorter in aroma containing and emitting term than the other carriers;

wherein the vent holes which respectively form an air inlet and an air outlet of the cartridge body are respectively arranged at one side and the other side of the cartridge body, and the air passage which connects the vent holes has at least one bent section;

wherein the carriers comprise first carriers arranged on the air passage of the cartridge body, third carriers arranged to be adjacent to a pair of the vent holes which respectively form an air inlet and an air outlet, and a second carrier arranged between the first carriers and the third carriers;

wherein the first carriers are arranged on the air passage of the cartridge body in the plural; and wherein the third carriers are additionally arranged between the first carriers arranged on the air passage.

5. An aroma-diffusing cartridge for a vehicle comprising:
a cartridge body which has a pair of vent holes at one side to make air flow in and out and a space which is a passage formed therein to allow the inflow air to flow;
a plurality of carriers arranged and mounted inside the cartridge body to contain and emit aroma according to an air flow path, wherein the carriers have different aroma containing structures that are different in aroma containing and emitting term from one another;

wherein at least one of the carriers is relatively longer or shorter in aroma containing and emitting term than the other carriers;

wherein the vent holes which respectively form an air inlet and an air outlet of the cartridge body are respectively arranged at one side and the other side of the cartridge body, and the air passage which connects the vent holes has at least one bent section;

wherein the carriers comprise first carriers arranged on the air passage of the cartridge body, third carriers arranged to be adjacent to a pair of the vent holes which respectively form an air inlet and an air outlet, and a second carrier arranged between the first carriers and the third carriers; and wherein the first carriers, the second carrier and the third carriers are arranged in such a way that the air introduced into the cartridge body through the vent hole passes the first carriers, the second carrier and the third carriers in turn at least twice.

6. The aroma-diffusing cartridge according to claim 5, wherein the air introduced through one vent hole flows to the third carriers, the second carrier and the first carriers in order, and then, is discharged out through the first carriers, the second carrier and the third carriers via the other vent hole in order.

7. An aroma-diffusing cartridge for a vehicle comprising:
a cartridge body which has a pair of vent holes at one side to make air flow in and out and a space which is a passage formed therein to allow the inflow air to flow;
a plurality of carriers arranged and mounted inside the cartridge body to contain and emit aroma according to an air flow path, wherein the carriers have different aroma containing structures that are different in aroma containing and emitting term from one another;

wherein at least one of the carriers is relatively longer or shorter in aroma containing and emitting term than the other carriers;

wherein the vent holes which respectively form an air inlet and an air outlet of the cartridge body are respectively arranged at one side and the other side of the cartridge body, and the air passage which connects the vent holes has at least one bent section;

wherein the carriers comprise first carriers arranged on the air passage of the cartridge body, third carriers arranged to be adjacent to a pair of the vent holes which respectively form an air inlet and an air outlet, and a second carrier arranged between the first carriers and the third carriers; and wherein the first carriers have a honeycomb structure of a gel type, the second carrier is made of porous resin which contains liquid aroma, and the third carriers have a hollow form which contains gel.

8. An aroma-diffusing cartridge for a vehicle comprising:

a cartridge body which has a pair of vent holes at one side to make air flow in and out and a space which is a passage formed therein to allow the inflow air to flow;

a plurality of carriers arranged and mounted inside the cartridge body to contain and emit aroma according to an air flow path, wherein the carriers have different aroma containing structures that are different in aroma containing and emitting term from one another;

wherein at least one of the carriers is relatively longer or shorter in aroma containing and emitting term than the other carriers;

wherein the vent holes which respectively form an air inlet and an air outlet of the cartridge body are respectively arranged at one side and the other side of the cartridge body, and the air passage which connects the vent holes has at least one bent section;

wherein the carriers comprise first carriers arranged on the air passage of the cartridge body, third carriers arranged to be adjacent to a pair of the vent holes which respectively form an air inlet and an air outlet, and a second carrier arranged between the first carriers and the third carriers; and wherein each of the first carriers and the third carriers respectively have coating layers formed on at least one side thereof.

9. An aroma-diffusing cartridge for a vehicle comprising:

a cartridge body having a pair of vent holes, one of the vent holes providing an air inlet and the other of the vent holes providing an air outlet wherein air flows in the air inlet and out the air outlet, and a space forming a passage through which the air flows from the air inlet to the air outlet;

a plurality of carriers arranged and mounted inside the cartridge body to contain and emit aroma according to an air flow path; and wherein the carriers have different aroma containing structures that are different in aroma containing and emitting term from one another, and are arranged relative to one another such that the air flows in the air inlet, through each of the carriers, and out the air outlet.

10. The aroma-diffusing cartridge according to claim 9, wherein the carriers include first carriers, third carriers, and at least one second carrier arranged between the first carriers and the third carriers.

11. The aroma-diffusing cartridge according to claim 10, wherein the first carriers, the at least one second carrier and the third carriers are arranged such that the air introduced into the air inlet passes through the first carriers, the at least one second carrier and the third carriers in turn at least twice.

* * * * *